United States Patent [19]

Samokovliski et al.

[11] 4,098,445
[45] Jul. 4, 1978

[54] CONTROLLABLE-FORCE WIRE ADVANCE ARRANGEMENT FOR ELECTRIC-ARC WELDING APPLICATIONS

[75] Inventors: David Albert Samokovliski; Petko Kostadinov Grozdanov; Alfred Emmerich Nemechek; Peter Dimitrov Petrov; Simeon Georgiev Punchev, all of Sofia, Bulgaria

[73] Assignee: Institute Po Zavaryavane, Sofia, Bulgaria

[21] Appl. No.: 726,279

[22] Filed: Sep. 24, 1976

[30] Foreign Application Priority Data

Sep. 24, 1975 [BG] Bulgaria .................................. 33770

[51] Int. Cl.² ............................................ B65H 17/20
[52] U.S. Cl. ................................. 226/186; 214/339; 226/188
[58] Field of Search ............... 214/339, 338; 226/181, 226/186, 188, 187, 168; 228/41; 74/25; 219/130, 131 F

[56] References Cited

U.S. PATENT DOCUMENTS

| | | | |
|---|---|---|---|
| 3,014,519 | 12/1961 | Wright | 226/181 X |
| 3,684,152 | 8/1972 | Boden | 226/168 X |
| 3,738,555 | 6/1973 | Karnes et al. | 226/188 X |

Primary Examiner—Bruce H. Stoner, Jr.

[57] ABSTRACT

A force-adjustable wire advancing mechanism for converting rotations of a motor shaft to a linear advance of a wire electrode into an arc-welding system is described. A pair of skewed rollers are carried in the front part of a two-part feed housing on a pair of radially reciprocable pistons, which in their innermost positions are effective to engage the rollers with the wire to advance the wire as the housing is rotated. In order to bring the rollers into operative position, a motion-translating element fixedly connected to the rear part of the housing and to the motor shaft is threaded onto a rear surface of the front part of the housing, and includes an integral outer conical guiding element that is cooperable with like ends of a pair of two-armed levers pivotally supported in the housing. A pair of biasing springs urge the pistons outwardly against the opposite ends of the levers, and a second pair of rollers are carried in recesses on the first ends of the levers for engagement with the opposed portions of the conical guiding element. With this arrangement, relative turning movement of the front and rear parts of the housing will cause the conical element to move axially with respect to the front part of the housing, thereby varying the force by which the levers force the skewed rollers, via the pistons, against the advancing wire.

3 Claims, 4 Drawing Figures

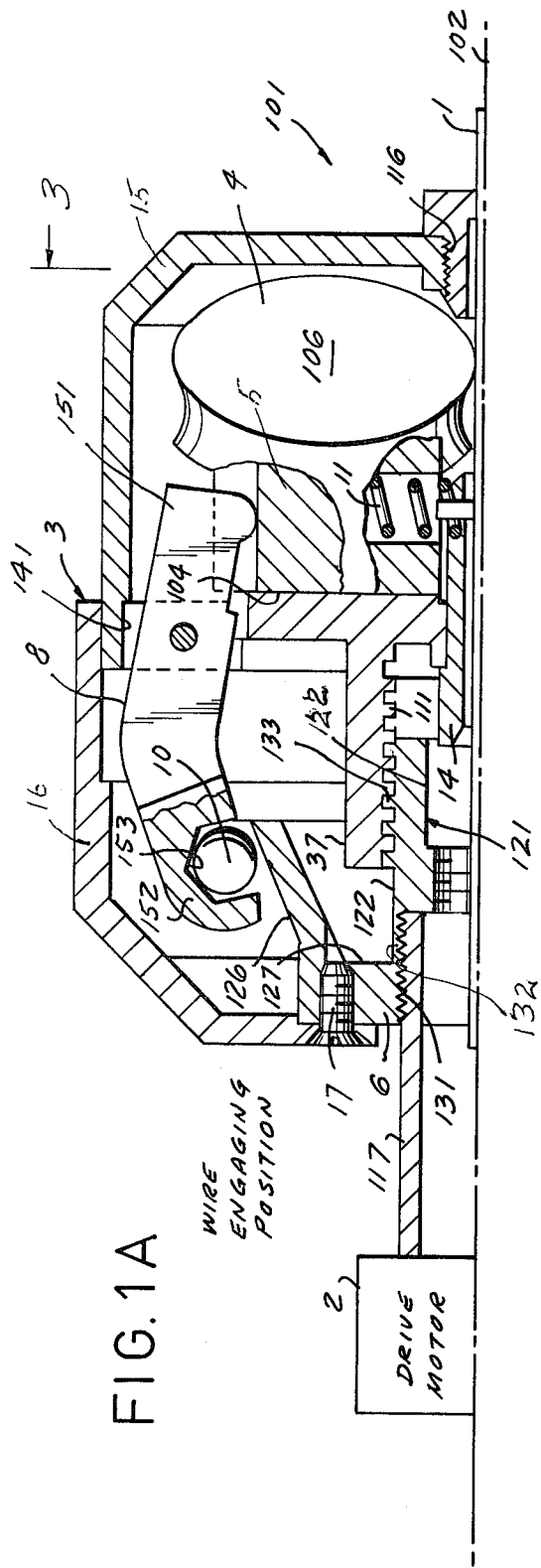
FIG.1A  WIRE ENGAGING POSITION
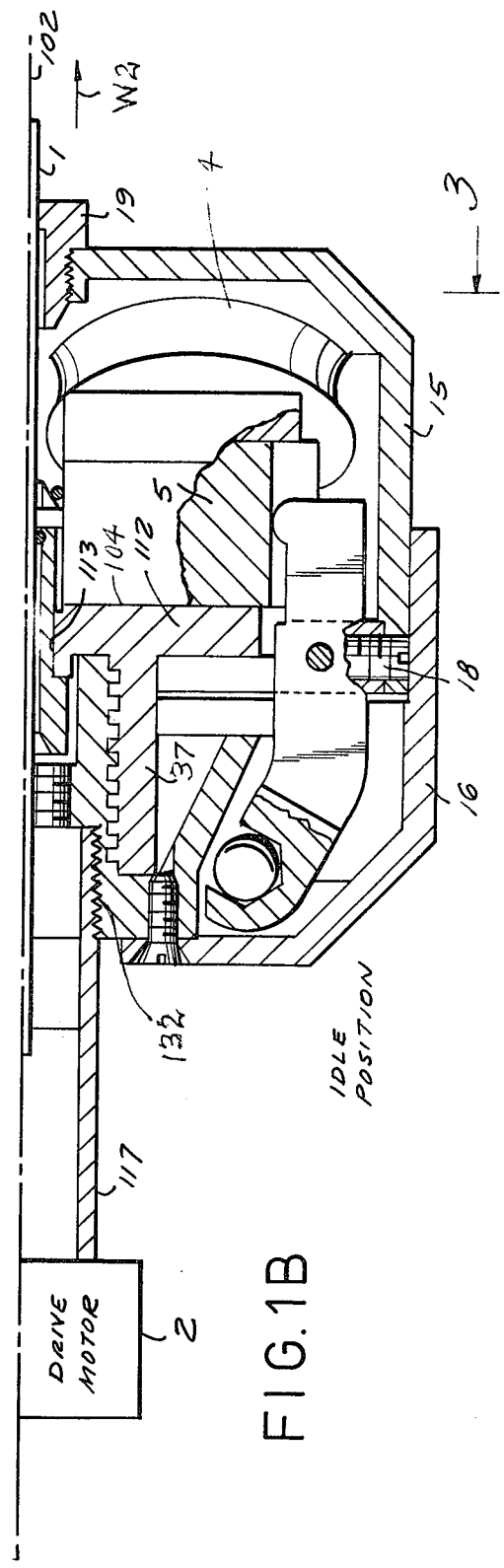
FIG.1B  IDLE POSITION

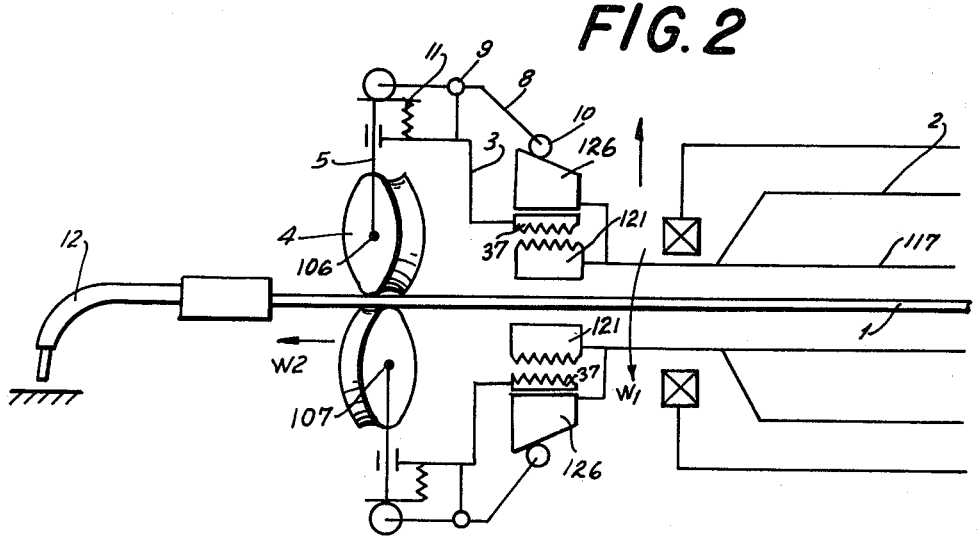
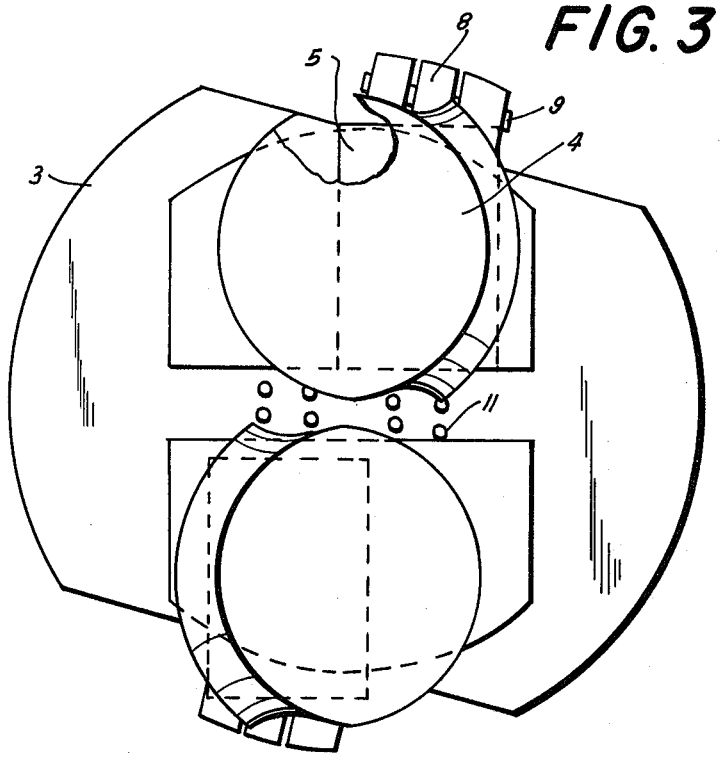

CONTROLLABLE-FORCE WIRE ADVANCE ARRANGEMENT FOR ELECTRIC-ARC WELDING APPLICATIONS

CROSS-REFERENCE TO RELATED APPLICATIONS

This application is related to the following copending, coassigned applications filed on even date herewith: (1) Ser. No. 726,280, now abandoned, based on the first-filed Bulgarian application No. 33,773, dated Sept. 24, 1975; (2) Ser. No. 726,278, based on the first-filed Bulgarian application No. 33,772, filed Sept. 24, 1975; (3) Ser. No. 726,424, based on the first-filed Bulgarian application No. 33,771, dated Sept. 24, 1975; and (4) Ser. No. 726,412, now U.S. Pat. No. 4,049,172, based on the first-filed Bulgarian application No. 31,062 dated Aug. 24, 1975.

BACKGROUND OF THE INVENTION

The invention relates to wire advancing arrangements for electric arc-welding applications, and more particularly to adjustable-force arrangements of this type employing planetary rollers for advancing the wire.

In one known system of this type for feeding an electrode wire forwardly along a first axis and into the arc-welding arrangement, a pair of skewed rollers are individually carried by a pair of pistons that are reciprocated radially in a feed housing on opposite sides of the axis. When the pistons are in their innermost position, the rollers cooperate to engage the wire in screw thread-like fashion so that, upon a rotation of a drive motor shaft coupled to the feed housing, the skewed rollers rotate in planetary fashion as the housing revolves on its axis to advance the thread. In order to permit adjustable of the force applied to the wire by the rollers as a function of the wire diameter and/or the load to which the wire is subjected by the arc-welding facilities during advance, an adjustable threaded nut or the like is provided for engagement with a threaded rear portion of the main housing. The adjustment nut is dynamically coupled to at least one of the pistons to adjust the force of the rollers on the engaged wire.

A disadvantage of such designs is that the force adjustment (e.g., by turning the threaded nut) is done manually and for each setting is only suitable for a narrow range of wire diameters and loads.

SUMMARY OF THE INVENTION

Such problems are overcome in accordance with the invention with an improved wire-feeding mechanism of the abovementioned planetary type, which is arranged to automatically adjust the advancing force applied to the wire by the skewed rollers notwithstanding wide dynamic variations in wire diameter and system load.

In an illustrative embodiment, the shaft of the drive motor connected to a motion translating element which is separate from and adjustably threaded on the front part of a two-part held housing. A concial guide surface is integral with and surrounds the threaded portion of the translating element, whereby a rotation of the translating element with respect to the front part of the housing will cause the front part of the held housing to move with an axial component along the axis of wire advance.

A pair of levers are pivotally supported in the front part of the held housing intermediate their ends, and extend longitudinally in the housing so that like front ends of the housing terminate opposite the radially outer ends of reciprocable pistons, while the corresponding rear ends of the levers terminate opposite the conical guide surface of the translating element.

A pair of rollers are carried in recesses at the rear ends of the pistons for effecting engagement with the adjacent portion of the conical guide surface. As a result, upon an axial movement of the front part of the housing, the levers are jointly and symmetrically pivoted about their fulcrums to symmetrically urge the pistons inwardly against the force of a pair of associated biasing springs, so that the force of engagement of the skewed rollers with the wire is made proportional to the relative movement of the translating element and the front part of the housing, which in turn is determined by instantaneous changes in the diameter of and/or load on the advancing wire.

Advantageously, the above-described advancing mechanism is enclosed by a pair of superposed cover members that are individually affixed to the translating element and to the housing, respectively.

BRIEF DESCRIPTION OF THE DRAWING

The invention is further set forth in the following detailed description taken in conjunction with the appended drawing, in which:

FIG. 1A is a view in longitudinal section of a wireadvancing apparatus constructed in accordance with the invention, the mechanism being shown in wire-engaging position;

FIG. 1B is a view similar to FIG. 1A but illustrating the mechanism in an idle position;

FIG. 2 is a schematic view of the principal portions of the mechanism of FIG. 1, illustrating the connection of the shaft of a drive motor to a portion of such mechanism and further illustrating the passage of a wire electrode to be guided by the mechanism through a welding tube disposed downstream of the mechanism; and FIG. 3 is a sectional view taken along line 3-3 of FIG. 1.

DETAILED DESCRIPTION

In the following description the front part of the planetary type mechanism is described as lying at the right and the rear part of the planetary type mechanism is described as lying at the left.

Referring now to FIGS. 1A and 1B of the drawing, the numeral 101 represents a planetary-type mechanism for selectively advancing a wire electrode 1 in the direction from left to right along an axis 102 into a portion of an arc-welding apparatus, illustratively a welding tube 12 (FIG. 2), in a forward direction represented by an arrow W2. The mechanism 101 includes a generally cylindrical housing 3, which is disposed concentric with the axis 102. Housing 3 has a rear part 16 and a front part 15 telescopically mounted within and reciprocable relative to rear part 16. A pair of pistons 5 are supported in seats 104 within the housing part 15 for radial reciprocation therein between an innermost position shown in FIG. 1A and an outermost position shown in FIG. 1B. Each piston 5 is normally urged in a radially outward direction by means of an associated biasing spring 11.

A pair of wire-engaging rollers 4 are rotatably carried on the respective pistons 5 on opposite sides of the axis 102. As shown best in FIG. 2, the respective rollers 4 have individual axes 106, 107 that are skewed in symmetrical relation to the axis 102. With such arrangement, a rotation of the housing 3 about the axis 102 in the direction W1 (FIG. 2) will cause a planetary or orbital movement of the respective rollers 4 about the axis 102; and when the pistons 5 are moved into the radially innermost position as shown in FIG. 1A, the engagement by the grooves of the skewed rollers 4 with the interposed wire 1 while such rollers orbit will cause a screw thread-like action, thereby linearly advancing the wire 1 with a force that is proportional to the pressure of engagement of the roller grooves on the wire.

The front part 15 of the housing 3 has a projecting rear portion 37 having a threaded inner surface 111. The portion 37 extends rearwardly from a disc-like flange 112 of the front part 15 of housing 3. A rear wire-guiding nozzle 14 is seated within an aperture 113 in the central portion of the disc 112. A front wire-guiding nozzle 19 is disposed forwardly of and in axially aligned relation to the rear nozzle 14, and is supported within a central aperture 116 of the rearwardly-facing portion 15 of the housing 3.

A drive motor 2 is disposed upstream of the mechanism 101, and includes a hollow shaft 117 through which the wire 1 extends. Shaft 117 is threaded at 131, the threaded portion of the shaft threadedly engaging the threads 132 on the hole through a motion-translating element 6.

In general, planetary wire-advancing mechanisms of the type thusfar described have been arranged to convert the force of rotary motion of a motor shaft (e.g., the shaft 117) to a linear advancing force along the axis of movement of the wire 1, i.e., by translating the rotational movement of the motor 2 to a component of pressure of the skewed rollers 4 on the wire 1. In certain of such designs, the drive motor was connected rigidly to the feed housing, so that the rotation of the drive motor was converted to the required advancing force, with an adjustability provided, e.g., by a threaded adjusting nut associated with the rear portion of the feed housing. Such designs, however, have not efficiently compensated for the changes in advancing force necessary during dynamic changes in the diameter of the wire 1 or of the load to which such wire is subjected.

In accordance with the invention, required changes in advancing force on the wire 1 are automatically accommodated with the use of the additional portions of the mechanism 101 shown in FIGS. 1A and 1B. In particular, a motion translating element 6 concentric with the axis 102 is connected between the shaft 117 of the drive motor 2 and the rear portion 37 of the front part 15 of the housing 3. The element 6 includes a cylindrical inner portion 121 having threaded outer surface 122 that cooperates with the matingly threaded inner surface 111 of the housing portion 37; in the normal case, the run-in of the portion 121 of the element 6 within the portion 37 is arranged to allow relative rotation between the portions 121 and 37 while the skewed feed rollers 4 are separated from the wire 1.

The element 6 further has an outer conical guiding portion 126 which is integral with the inner cylindrical portion 121 and separated therefrom by a radial region 127. The conical guiding surface 126 diverges in a forward direction as shown.

As above mentioned shaft 117 of the drive motor 2 is fixedly connected to the translating element 6. In the arrangement of FIGS. 1A and 1B, such rigid connection is accomplished by a tight engagement between a threaded outer end 131 of the shaft 117 and a threaded inner surface 132 of the cylindrical portion 121 of the element 6. If desired, such surface 132 can be provided with a limit stop for limiting the run-in of the shaft 117. In any event, the threaded engagement between the parts 131 and 132 is much tighter than the slip-type threaded engagement between the surfaces 111 and 122.

The rear housing portion 16, constituting the rear part of the two-part housing, of the mechanism 101 is disposed in surrounding relation to the translating element 6 and is secured thereto by means of screws 17. The confronting ends of the housing portions 16 and 15 are situated in overlapping relation as shown, whereby a relative rotation of the surfaces 111 and 122 as indicated below will cause a relative axial sliding engagement between the cover portions 15 and 16, as well as relative axial movement between the conical quiding surface 126 and the front housing portion 15 of the housing 3.

The generally cylindrical configuration of the disc flange 112 on the housing 3 is interrupted by a pair of cutouts 141 disposed on radially opposite sides of the axis 102. A pair of pivot pins are fixed secured in the housing within the cutouts 141, and serve as fulcrums for a pair of two-armed levers 8 which extend longitudinally within the mechanism 101 through the cutouts 141. Each of the levers 8 has a forward portion 151 that terminates adjacent a radially opposite surface of one of the pistons 5. Each such lever further has a rear portion 152 that terminates adjacent the conical guiding surface 126 of the translating element 6. With such arrangement the springs 11 situated within the pistons 5 tend to bias the associated levers 8 in a counterclockwise direction as viewed in FIG. 1A and in a clockwise direction as viewed in FIG. 1B.

The rear portion 152 of each lever 8 has a recess 153 disposed therein for holding a spherical bearing member 10, such member 10 projecting out of the recess 153 to engage the adjacent surface of the conical guide portion 126 as shown.

In the operation of the described arrangement, in which it will be assumed that the wire 1 has been threaded through the nozzles 14 and 19, the advancing operation is initiated by so actuating the drive motor 2 that the shaft 117 thereof, and thereby the translating element 6, is rotated in a direction W1 tending to unscrew the element 6 from the housing portion 37.

The action will cause the front housing part 15 to move forwardly with respect to the conical guide portion 126. The forward movement of the housing part 15 as the drive motor 2 unscrews the element 6 from the portion 37 of housing part 15 will cause the rear portion 152 of the opposed levers 8 to be cammed radially outwardly against the force of the springs 11, thereby moving the pistons 5 in a radially inward direction until the associated planetary skewed rollers 4 engage the wire 1. As progressive pressure is applied by the rollers 4 to the wire 1, the relative rotation of the threaded members 6 and 37 will decrease until, when appropriate advancing pressure is applied by the rollers 4 contingent on the then-occurring diameter of and load on the wire 1, the relative movement of the members 6 and 37 will stop, and the front part 15 of the housing 3 and the translating element 6 will be rotated as a unit by the motor 2.

In the event that the load on the wire 1 increases (e.g., during its passage through the welding tube 12), the rotation of the rollers 4, and thus the front part 15 of the housing 3, about axis 102, will be retarded relative to the shaft 117 and thus the translating element 6, so that once again a relative rotation will occur between the elements 6 and 37; specifically, such increase in load will again cause the element 6 to start to unscrew from the rear housing portion 37 so that the front housing part 15 of housing 3 again moves forwardly so that the conical guiding surface 126 further urges the rollers 4 against the wire 1 via the intermediary of the levers 8 and the pistons 5. The element 6 will continue to unscrew from the member 37 until the increase in advancing force on the wire 1 is sufficient to compensate for the increase in load, at which time the relative rotation of the members 6 and 37 again stops. The same effect, of course, will occur during dynamic changes in the diameter of the wire 1.

In the event that the load on the wire 1 decreases, the mechanism 101 will correspondingly adjust the advancing force in a manner exactly analogous to that just described.

When the drive motor 2 is shut down to stop the advancing operation of the wire 1, the translating element 6 will come to rest as soon as the motor shaft 117 stops. However, the rotating planetary rollers 4, and the remainder of the housing 3, will continue to rotate because of inertia. Such relative movement between the housing 3 and the translating element 6 will cause a run-in of the element toward each other, thereby moving the front part 15 of the housing 3 in a rearward direction, until the position shown in FIG. 1B is reached. In this situation, the actuating force on the rear end 152 of the lever 8 is relieved, so that the lever can again pivot into its biased position to permit the spring 11 to return the pistons 5 to their radially outermost position. This, in turn, will move the rollers 4 out of engagement with the wire 1 to stop the advance.

In the foregoing, an illustrative arrangement of the invention has been described. Many variations and modifications will now occur to those skilled in the art. It is accordingly desired that the scope of the appended claims not be limited to the specific disclosure herein contained.

What is claimed is:

1. In an apparatus for converting a rotational force of a motor shaft to a controlled linear force along a first axis for selectively advancing an elongated wire along the first axis, a substantially cylindrical hollow feed housing axially divided into front and rear parts axially movable with respect to each other and disposed coaxial with the first axis and through which the wire may be advanced in a forward direction, the front part of the feed housing having a threaded rear portion, first and second pistons individually supported in the front portion of the feed housing forwardly of the threaded portion for radial reciprocation on generally opposite sides of the first axis, first and second wire-advancing rollers carried by the respective first and second pistons for planetary rotation about the first axis during a rotation of the front part of the feed housing, the first and second rollers individually having axes that are skewed in symmetrically opposite directions with respect to the first axis to engage and advance the wire along the first axis when the rollers engage the wire, an integral motion translating element having a cylindrical inner portion and a conical outer portion mounted in the rear part of the feed housing, a surface of the cylindrical inner portion having a first surface threadedly engaged with a surface of the projecting rear portion of the front part of the feed housing, first and second levers individually pivotally supported in the front part of the housing intermediate their respective ends on generally opposite sides of the first axis and extending longitudinally in the front and rear parts of the housing, corresponding first ends of each lever terminating opposite the conical portion of the translating element and corresponding second ends of the levers terminating opposite the outer end of the respective first and second pistons, resilient means coupled to each piston for urging the outer end of the piston against the opposed second end of the associated lever, means associated with the first end of each lever for coupling such first end to the outer conical portion of the translating element, and means for connecting the motor shaft to the cylindrical inner portion of the translating element, relative rotation of the front and rear parts of the feed housing in a wire feeding direction causing the rollers to move toward each other.

2. Apparatus as defined in claim 1, in which the first end of each lever has a recess therein facing the outer conical portion of the translating element, and in which the coupling means comprises a roller carried in the recess and projecting outwardly therefrom to engage the conical portion.

3. Apparatus as defined in claim 1, further comprising first and second covers individually surrounding and secured to the front part of the held housing and the translating element, the covers being disposed in superposed relation.

* * * * *